United States Patent Office 2,728,684
Patented Dec. 27, 1955

2,728,684

STABLE EMULSIONS OF LOWER MOLECULAR WEIGHT POLYBUTENES

John L. Darragh, Alamo, Calif., assignor to California Research Corporation, San Francisco, Calif., a corporation of Delaware No Drawing. Application October 23, 1951,
Serial No. 252,799

3 Claims. (Cl. 106—285)

This invention relates to the preparation of stable emulsions of synthetic polymers of low molecular weight olefins. More particularly, it relates to the preparation of stable emulsions of polymers of normal and branched-chain butenes.

In conformity with the terminology employed in the art, these synthetic polymers of normal and branched-chain butenes are designated in the following description of the present invention by the term "polybutenes." This term refers to synthetic polymers of relatively low molecular weight ranging from about 400 to about 1500, corresponding to viscosities from about 50 to as much as 19,000 S. S. U. (seconds, Saybolt Universal) at 210° F., produced by the catalytic polymerization of normal and branched-chain butenes, for instance, by the processes disclosed in U. S. Patent No. 2,224,349 issued to Holm, Lyman and Miller, or in U. S. Patent No. 2,484,384 to Levine and Folsom. These butene polymers are characterized by the substantial absence of cyclic, polycyclic, diolefinic and paraffinic hydrocarbons and essentially consist of mixtures of homologous branched-chain hydrocarbons, some of which contain a single double bond. They are permanently fluid and non-drying, progressively approaching the characteristics of a plastic solid as their molecular weights approach the upper limit of about 1500, which corresponds to a total number of carbon atoms of the order of 130. Their viscosity and tackiness increase correspondingly with the increase of their molecular weight. Those polybutenes having viscosities in excess of 3000 S. S. U. at 210° F. and pour points higher than 45° F. display an extreme degree of initial tack and are permanently sticky.

Aqueous emulsions of these polybutenes have been reported in the art. However, the emulsification techniques employed in the past for this purpose required the application of relatively expensive emulsifying agents, such as triethanol ammonium stearate. Another even more serious drawback of these oil-in-water emulsions prepared by following the techniques of the prior art resides in their inadequate stability. The emulsions so prepared break down rather rapidly upon standing and storage. Furthermore, it has been considered impractical to carry out the formation of an oil-in-water type emulsion containing more than 60% by weight of polybutenes without subsequent risk of phase separation and/or inversion to a water-in-oil emulsion.

I have found that very stable polybutene-in-water emulsions can be produced in a simple and economical manner, that these emulsions do not undergo phase inversion at a polybutene content above 60% by weight, and that they are compatible with a number of compositions employed by the industry for the preparation of surface-coatings, paints, adhesives and in many other useful applications. To make these stable polybutene emulsions, I employ as the emulsifying agent an anionic surface-active agent from the group consisting of certain alkyl aryl sulfonates and alkyl sulfates. These sulfonates and sulfates effective in emulsifying polybutenes in water are sodium monoalkyl benzene sulfonates containing from 9 to 18 carbon atoms in the alkyl chain and characterized by molecular weights in the range from about 300 to about 430, and sodium monoalkyl sulfates containing from 12 to 15 carbon atoms in the alkyl chain.

One of the preferred methods for the production of one of the aforementioned effective emulsifying agents of my invention, namely sodium monoalkyl benzene sulfonate having from 12 to 15 carbon atoms in its alkyl chain, consists in sulfonating approximately 1 mol of $C_{12}$–$C_{15}$ alkyl benzene with about 2.5 to 3.5 mols of fuming sulfuric acid. Upon sulfonation, the resulting mixture of alkyl benzene sulfonic and unreacted sulfuric acids is allowed to settle, and most of the sulfuric acid is withdrawn by a suitable technique such as decantation to leave an acid mixture containing from 85 to 88% by weight of alkyl benzene sulfonic acid, which is then neutralized with the aid of an appropriate neutralizing agent, e. g. sodium hydroxide, to give a paste-like product in which approximately 50 to 55% by weight consists of sodium alkyl benzene sulfonate having from 12 to 15 carbon atoms in the alkyl chain and an average molecular weight of about 350, from 4 to 7% of inorganic salt and unsulfonated oil, the remainder being water.

To prepare polybutene emulsions of my invention this paste is first dispersed or dissolved in water, while heating it to a temperature from about 120 to about 180° F. Ordinarily the paste is added to water in such amounts as to result in a dispersion or solution of from 0.1 to 10.0 parts by weight of sodium alkyl benzene sulfonate emulsifier in from about 18 to about 90 parts by weight of water. Then polybutene preheated to a temperature from about 120 to about 280° F. is slowly added to this dispersion or solution of emulsifier in water, while vigorously stirring, to make up a total of 100 parts by weight. A sturdy drum with paddles in the interior thereof or any other rugged type of mixer is employed to effect this preliminary mixing of materials. Heat is applied to maintain the temperature between about 120 and about 180° F., depending on the viscosity of the resulting coarse emulsion. When polybutene has become completely dispersed to form a coarse emulsion, this latter is fed into a water-cooled colloid mill at the effluent rate of the mill. Agitation is continued in the premixing drum until it is empty. The coarse emulsion is thoroughly homogenized in the colloid mill to secure a sufficiently small particle size for the final emulsion of polybutene. The smaller the particle size, the more stable will be the resulting emulsion. The emulsion issuing from the colloid mill located beneath the drum may be recycled in order to obtain equilibrium conditions in the mill. The original clearance of the mill is 0.002 inch, becoming smaller as the mill gets warmed up to the operating temperature of the order of 100–120° F.

The amount of water and polybutene can be varied to produce emulsions containing up to 78 to 80% by weight of non-aqueous constituents which are non-volatile at 212° F. when a small sample of the emulsion, for example one gram, is dried to constant weight at 212° F. for about one hour. The emulsions contain non-aqueous constituents which are non-volatile at 212° F. in proportions greater than 50% by weight. Particularly satisfactory emulsions are those containing non-aqueous, non-volatile constituents of from about 60% to as high as 80% and contain a major proportion of polybutene emulsified in a minor proportion of water. These emulsions of high polybutene content can be subsequently diluted with water to a much lower consistency which may be as low as 1% of non-aqueous non-volatile constituents without running the risk of a breakdown or phase inversion.

The effective range for the sodium alkyl benzene sulfonate emulsifier lies between about 0.1 and about 10.0% by weight, based on the weight of the whole emulsion, the amounts from about 1.0 to about 2.5% by weight being preferred as the most economical and less likely to result in excessive foaming which may be introduced by the employment of emulsifier in excess of 3.0% by weight. In lieu of the sodium alkyl benzene sulfonate prepared as described hereinbefore, other similar surface-active alkyl aryl sulfonates such as keryl benzene sulfonates described in U. S. Patent No. 2,161,173 to Kyrides, and many other sulfonates of a similar kind, for instance those described on pages 122 and 123 of the book "Surface-active Agents," by Schwartz and Perry, 1944 (Interscience), may be successfully employed as emulsifiers for polybutene. Furthermore, alkyl sulfates containing from 12 to 15 carbon atoms in the alkyl portion, such as sodium lauryl sulfate, may be substituted for the preferred sodium alkyl benzene sulfonate emulsifier with equal success.

The following examples serve to illustrate the preparation of polybutene emulsions in accordance with my invention.

*Example 1*

In this example I used the previously-described sodium alkyl benzene sulfonate containing from 9 to 18 carbon atoms in the alkyl portion thereof and having an average molecular weight of about 350 to emulsify polybutene. Polybutene employed in this instance had an average molecular weight of 1200 and a viscosity of about 3000 S. S. U. at 210° F. The relative proportions of materials taken for the preparation of the emulsion were: Water, 30%; sodium alkyl benzene sulfonate paste (about 50% thereof being surface-active sulfonate), 2%; polybutene, 68%; the whole adding up to 100% by weight. Water and the sulfonate paste were combined and heated to 160° F., whereupon polybutene heated to a temperature of 260° F. was slowly added to the mixture, while agitating the whole continuously to form a coarse emulsion. This emulsion was immediately homogenized in a colloid mill as described hereinbefore. When the ultimate polybutene emulsion was left standing in a closed container for as long as 60 days, no evidence of breakdown or deterioration of stability was observed.

*Example 2*

In this example a stable emulsion was prepared by combining 42.0% by weight of water and 3.0% by weight of sodium lauryl sulfate paste (30% being surface-active sulfate) in the same manner as described before in Example 1, adding to the resulting mixture 55.0% by weight of polybutene of an average molecular weight of 570 and viscosity of 220 S. S. U. at 210° F., and homogenizing the whole in a colloid mill. The ultimate emulsion retained its stability after being stored for 2 weeks and could be diluted with hard water (300 p. p. m.) to 1% solids without breaking down or suffering a phase inversion.

*Example 3*

In this example, sodium alkyl benzene emulsifier of Example 1 was combined with water as described therein, but polybutene employed was of the maximum operative average molecular weight of about 1500 and had a viscosity of 19,000 S. S. U. at 210° F. The proportions of the components employed for the emulsion were as follows: Sodium $C_{12}$–$C_{15}$ alkyl benzene emulsifier, 2% by weight; water, 43% by weight; polybutene (molecular weight 1500), 55% by weight. The product obtained after the colloid mill treatment represented a stable emulsion which did not break down or show phase inversion after storage for 14 days.

All of my emulsions, as illustrated by Examples 1, 2 and 3, possessed an excellent stability on storage and could be diluted with water to a much lower content of non-aqueous constituents which are non-volatile at 212° F. These emulsions could be diluted to as low as 1% of non-aqueous, non-volatile constituents without undergoing phase inversion or breakdown. I also observed that the stability of my emulsions is not affected by the employment of either hard water (300 p. p. m.) or tap water (50 p. p. m.) in preparation or dilution.

The advantages obtained in producing stable emulsions of polybutenes in accordance with my invention are many. These emulsions are easier to handle than the non-emulsified straight polybutenes which are known to be quite sticky at room temperature and, consequently, must be heated for unimpeded handling. Furthermore, the use of these emulsions obviates the difficulties previously had in cleaning the containers after the removal of polybutenes.

My polybutene emulsions display excellent compatibility with a number of industrial materials, tending to improve the useful characteristics thereof. The absence of costly and inflammable solvents likewise represents a substantial advantage. They are compatible with emulsions of polyvinyl acetate in amounts as high as 20–22% by weight thereof and, consequently, can be employed as extenders in polyvinyl acetate coatings in the manufacture of wall board, particularly in the manufacture of soundproof soft board or acoustical tile. When so employed, they not only act as extenders, but also as plasticizers and increase the water resistance of the polyvinyl acetate coating film. They may be furthermore employed in the same capacity of extenders and plasticizers in butadiene-styrene emulsions employed in paints.

These light-colored and practically odorless polybutene emulsions also find an attractive application in the paper industry as water-resistant coatings of a light color, for instance in the production of multi-wall paper bags. In fact, a great number of other applications of my polybutene emulsions are possible, for instance in various emulsions of rubber, resins, asphalt, pigment and glue for the purpose of modifying the pliability and tackiness of their films, and in general whenever inexpensive though efficient extenders, plasticizers or sealing compounds are desired.

It should be understood that the invention is not limited by the disclosures of the specific examples given in the specification for the mere purpose of illustration. Accordingly, all possible modifications coming within the scope and spirit of the annexed claims shall be embraced thereby.

I claim:

1. A stable aqueous emulsion consisting essentially of a major part up to about 80% by weight of polybutenes having a molecular weight in the range of 400 to 1500, said polybutenes being in the discontinuous phase, and as the sole emulsifying agent, from about 0.1% to about 10% by weight of the total emulsion of an emulsifying agent consisting essentially of an anionic surface active agent selected from the group consisting of a sodium alkyl benzene sulfonate having 9 to 18 carbon atoms in the alkyl chain and a sodium alkyl sulfate having 12 to 15 carbon atoms in the alkyl chain, the remainder of said emulsion being water and neutral inorganic salts normally occurring with said surface active agent, said emulsion having the property of producing a stable emulsion when diluted with hard water to as little as 1% by weight of non-aqueous ingredients which are non-volatile when a one gram sample of the emulsion is dried at 212° F. for one hour.

2. The composition of claim 1 wherein the surface active agent is a sodium alkyl benzene sulfonate.

3. The composition of claim 1 wherein the surface active agent is a sodium alkyl sulfate.

References Cited in the file of this patent

UNITED STATES PATENTS

| | | |
|---|---|---|
| 2,194,958 | Szegvari et al. | Mar. 26, 1940 |
| 2,339,958 | Sparks | Jan. 25, 1944 |
| 2,367,468 | Mixon et al. | Jan. 16, 1945 |
| 2,389,796 | Mack | Nov. 27, 1945 |
| 2,504,920 | Buckman et al. | Apr. 18, 1950 |
| 2,543,487 | Budner et al. | Feb. 27, 1951 |